United States Patent [19]

Batdorf

[11] Patent Number: 5,317,056
[45] Date of Patent: * May 31, 1994

[54] COMPOSITION FOR WETTING AND ENCAPSULATING ASBESTOS AND METHOD OF USING

[75] Inventor: Vern H. Batdorf, Minneapolis, Minn.

[73] Assignee: H.B. Fuller Company, Vadnais Heights, Minn.

[*] Notice: The portion of the term of this patent subsequent to Sep. 12, 2006 has been disclaimed.

[21] Appl. No.: 687,102

[22] Filed: Apr. 18, 1991

Related U.S. Application Data

[60] Continuation of Ser. No. 350,084, May 10, 1989, Pat. No. 5,034,247, which is a division of Ser. No. 213,355, Jun. 30, 1988, Pat. No. 4,866,105.

[51] Int. Cl.$^5$ .................. C08L 9/00; C08K 3/34; C08F 20/10; B08B 7/00
[52] U.S. Cl. .................. 524/556; 524/563; 524/574; 524/452; 524/791; 524/575
[58] Field of Search ............... 524/556, 563, 574, 452, 524/791

[56] References Cited

U.S. PATENT DOCUMENTS

| | | | |
|---|---|---|---|
| 3,660,148 | 5/1972 | Heron | 117/126 |
| 3,965,284 | 6/1976 | Xanthos et al. | 428/404 |
| 4,274,676 | 6/1981 | Chapel | 299/64 |
| 4,699,666 | 10/1987 | Tidquist et al. | 134/4 |

OTHER PUBLICATIONS

International Protective Coatings Corporation "Serpi-flex Shield TM," (May 1987) Brochure.
The Better Working Environments, Inc., "BWE 5000 TM," Oct. 2, 1987.

*Primary Examiner*—Paul R. Michl
*Assistant Examiner*—Andrew E. C. Merriam
*Attorney, Agent, or Firm*—Merchant, Gould, Smith, Edell, Welter & Schmidt

[57] ABSTRACT

A substantially nonthixotropic composition capable of minimizing the amount of airborne asbestos particles released during removal of asbestos from a structural unit and encapsulating the removed asbestos to permanently prevent the release of airborne asbestos particles. The composition includes (i) a major proportion of water, (ii) a nonionic-surfactant-stabilized latex, such as a latex of styrene butyl rubber, having a viscosity of less than about 300 cps and a maximum particle size of less than about 0.4 microns, (iii) sufficient nonionic surfactant to reduce the surface tension of the composition to less than about 40 dynes per cm, and (iv) a cationic surfactant. Optionally, the composition may further include a defoamant, a corrosion inhibitor, a pH buffering agent, a freezing point depressant and/or a dye.

12 Claims, No Drawings

COMPOSITION FOR WETTING AND ENCAPSULATING ASBESTOS AND METHOD OF USING

This is a continuation of application Ser. No. 07/350,084, filed May 10, 1989 now U.S. Pat. No. 5,034,247, which is a division of application Ser. No. 07/213,355, filed Jun. 30, 1988, now U.S. Pat. No. 4,866,105, issued Sep. 12, 1989.

FIELD OF THE INVENTION

My invention relates to compositions which, when sprayed onto an asbestos-containing material bound to the surface of a structural unit, can reduce the number of airborne asbestos particles generated during debriding of the asbestos-containing material from the structural unit.

BACKGROUND OF THE INVENTION

Asbestos is the popular name for several naturally-occurring, chemically-resistant, fibrous forms of impure silicates.

Until relatively recently, asbestos-containing materials were routinely employed as a fireproofing, insulating and/or acoustical material in the construction of all types of buildings ranging from residential homes to office and industrial complexes. Typically, asbestos was combined with other fibrous materials such as fiberglass and a binding agent and then sprayed onto structural units such as steel I-beams and duct-work to a thickness of about 1 to 3 inches.

When studies began to link the presence of airborne asbestos particles with the development of significant respiratory health problems, the use of asbestos as a fireproofing, insulating and acoustical construction material significantly decreased until it was regulatory banned. Long term exposure to airborne asbestos particles has been associated with the development of such serious respiratory diseases as cancer of the lung, pleura, peritoneum and asbestosis. In addition, it is believed that even slight or periodic exposure to relatively low levels of airborne asbestos particles can result in troublesome respiratory problems.

Despite the fact that asbestos-containing materials are no longer employed as a fireproofing, insulating or acoustical construction material, asbestos still poses a significant health risk to millions of people due to its continued presence in those buildings constructed before the use of asbestos-containing materials was discontinued. Although the asbestos in the asbestos-containing material is typically bound by a binding agent to the various structural units within the building, airborne asbestos fibers may still be released as such asbestos containing materials typically become friable over time. To complicate the control of airborne asbestos, asbestos fibers are notorious for their ability to remain airborne for extended periods of time.

Accordingly, it is recognized that in order to properly address the health hazard associated with airborne asbestos, it is necessary not only to cease further use of asbestos-containing material as a fireproofing, insulating or acoustical construction material, but also to control or eliminate that asbestos-containing material already in use.

A temporary, relatively inexpensive method which has been employed to control the airborne release of asbestos fibers is the spraying of either a penetrating or surface-coating encapsulating material onto asbestos-containing materials in an attempt to lock-in the asbestos. However, because of the possibility that such encapsulating coatings will crack or otherwise lose their integrity and once again allow the airborne release of asbestos, this method is not preferred.

The preferred method for controlling the release of airborne asbestos in a structure is to completely remove all asbestos from that structure. This method involves considerable time and expense as it (i) requires a building to be completely sealed off and dismantled so as to expose all structural units coated with an asbestos-containing material, (ii) requires all asbestos-containing material to be debrided from each structural unit under conditions designed to minimize the generation of airborne asbestos particles, and (iii) requires all debrided asbestos-containing material to be collected and disposed of under conditions designed to minimize the generation of airborne asbestos particles. In order to minimize the amount of airborne asbestos particles generated during the removal process, a wetting agent is typically sprayed onto the asbestos-containing material prior to debriding of the material from the structural units.

U.S. Pat. No. 4,699,666, issued to Tidquist et al, discloses a typical wetting agent for use in minimizing the amount of airborne asbestos particles generated during the removal of an asbestos-containing material from a structural unit. The composition disclosed by Weisberg is an aqueous solution of an ethylene oxide homopolymer having a molecular weight of about 100,000 to 5,000,000. While more effective than many other alternatives, the composition of Tidquist et al suffers from several drawbacks, including (i) poor penetration into asbestos-containing materials, (ii) ineffective absorption into the individual asbestos fibers, (iii) inability to effectively prevent the airborne release of asbestos fibers after the composition dries, and (v) creation of a hazardous, slippery condition on the floor of the work area during the removal process.

A composition considered for use in minimizing the number of airborne asbestos particles generated during the removal of an asbestos-containing material from a structural unit, should provide (i) effective penetration into an asbestos-containing matrix, (ii) effective, airborne inhibiting absorption into individual asbestos fibers, (iii) effective, drip preventing initial adhesion to an asbestos-containing material, and (iv) encapsulation of the removed asbestos-containing material so as to prevent the removed asbestos from becoming airborne during collection and disposal.

It is noted that both OSHA and the EPA have created regulatory maximums for the concentration of airborne asbestos fibers which may be generated during the debriding of asbestos-containing materials. Accordingly, any composition intended to be employed in the removal of asbestos-containing materials from a structural unit must be capable of maintaining the concentration of airborne asbestos fibers below the regulatory maximums.

SUMMARY OF THE INVENTION

I have discovered a composition which, when sprayed onto asbestos-containing material bound to the surface of a structural unit, can significantly reduce the number of airborne asbestos particles released during removal, collection and disposal of the asbestos-containing material. In addition, the composition can bind and encapsulate the removed asbestos-containing material so as to prevent the asbestos from becoming airborne during and after disposal of the asbestos.

The Composition

The composition of my invention comprises: (aa) about 70 to 95 wt-% water, (bb) about 5 to 30 wt-% latex which is stabilized with a nonionic surfactant and has a solids content of about 45 to 60 wt-%, based upon the latex, a Brookfield viscosity of less than about 1500 cps, and a maximum particle size of less than about 0.4 microns, (cc) an effective amount of a nonionic surfactant sufficient to reduce the surface tension of the composition to less than about 40 dynes per cm, and (dd) about 0.1 to 0.5 wt-% cationic surfactant.

Optionally, the composition of my invention may further include (ee) an effective defoaming amount of aa defoamant, (ff) an effective corrosion inhibiting amount of a water soluble corrosion inhibitor, (gg) an effective amount of a buffering agent sufficient to buffer the composition to a pH of about 9 to 10, (hh) up to about 5 wt-% of a freezing point depressant, and/or (jj) an effective coloring amount of a dye.

Application of The Composition

The composition of my invention may be effectively employed to reduce the number of airborne asbestos particles created during the removal of an asbestos-containing material from a structural unit by (AA) contacting the asbestos-containing material with an effective wetting amount of the composition, (BB) allowing the composition to penetrate into and be absorbed by the asbestos-containing material, (CC) debriding the wetted asbestos-containing material from the structural unit, and (DD) collecting and disposing of the removed asbestos-containing material. That portion of the composition which is exposed to the atmosphere will eventually harden so as to encapsulate the asbestos-containing material in a pliable coating and thereby prevent the release of airborne asbestos so long as the integrity of the coating is not destroyed by environmental factors focus such as being crushed.

I have discovered that the composition of my invention is effective upon all types of asbestos including both amphibole and serpentine type asbestos.

Benefits

The composition of my invention provides many benefits in the removal of asbestos-containing material from structural units, including specifically, but not exclusively:

(1) The composition can quickly and deeply penetrate all types of asbestos-containing material so as to reduce work delays, drippage of composition from the structural unit and the need for repeated applications.

(2) The composition is quickly and thoroughly absorbed into individual asbestos fibers so as to reduce drippage, the amount of composition released by the asbestos-containing material after the asbestos-containing material is removed from the structural unit, and the amount of composition which must be employed. In addition, effective absorption is one of the key factors in insuring an effective reduction in the amount of airborne asbestos particles created during the removal process.

(3) The composition has a strong initial adhesion to asbestos-containing materials so as to significantly reduce drippage of the composition.

(4) The composition can effectively encapsulate asbestos fibers in a pliable coating so as to prevent the release of airborne asbestos particles during collection and disposal of removed asbestos-containing materials.

(5) The composition can be employed to encapsulate and lock-in residual asbestos fibers remaining on a structural unit after removal of a majority of the asbestos-containing material.

(6) The composition has a slow drying time so as to substantially eliminate any problems associated with the unintentional drying of the composition once it has been sprayed onto an asbestos-containing material but before removal of the asbestos-containing material.

(7) The composition is only slightly more slippery than water so as to limit any slip hazard created by the presence of the composition on the floor of a work area.

(8) The composition can soften an asbestos-containing matrix so as to aid in debriding of the asbestos-containing material.

(9) The composition is nontoxic, substantially nonirritating and has substantially no objectionable odor.

(10) The composition is easily cleaned-up with water.

(11) The composition is easily sprayed by conventional atomizing equipment commonly employed in the industry.

Definitions

As utilized herein, the term "wt-%" refers to wt-% of the total composition unless otherwise specified.

As utilized herein, the term "penetration" or "penetrating" refers to both rate of penetration and depth of penetration unless otherwise specified.

DETAILED DESCRIPTION OF THE INVENTION

Including a Best Mode

I have discovered that by combining a latex, a nonionic surfactant and a cationic surfactant in a major proportion of water, a composition can be achieved which can effectively adhere to, penetrate, be absorbed by and encapsulate an asbestos-containing material so as to prevent airborne asbestos from being released during debriding of an asbestos-containing material from structural unit.

Latex

My composition includes about 5 to 30 wt-%, preferably about 10 to 15 wt-%, latex which has been stabilized with a nonionic surfactant and contains about 45 to 60 wt-% solids. Incorporation of less than about 5 wt-% latex can greatly enhance the penetration of the composition into an asbestos-containing matrix but is not recommended as it can also result in ineffective encapsulation of the asbestos-containing material. Incorporation of more than about 30 wt-% latex can result in ineffective penetration of the composition into an asbestos-containing matrix. The wt-% solids in the latex itself is not critical, but is provided to aid in understanding the significance of the wt-% latex in the total composition.

The latex should have a Brookfield viscosity of less than about 1500 cps, preferably less than about 1000 cps and most preferably a viscosity which is as low as possible without significantly affecting the other desired properties. A latex viscosity of greater than about 1500 cps can result in ineffective penetration and absorption of the composition into an asbestos-containing matrix.

The latex should not contain particles large than about 0.4 microns. Preferably, the latex has a maximum particle size of less than about 0.2 microns. The presence of particles which are larger than about 0.4 microns can result in ineffective penetration. While not intending to be limited thereby, I believe that penetration is reduced by the presence of particles which are large than about 0.4 microns because particles large than about 0.4 microns tend to become trapped within the pores of the asbestos-containing material and block further penetration of the composition.

Suitable latexes for use in the composition include latexes of styrene butyl rubber, ethylene vinyl acetate, acrylic homopolymers, vinyl acrylic copolymers, styrene acrylic copolymers, and the like.

The latex component of the composition provides for the encapsulation of removed asbestos-containing material in a pliable coating in order to prevent the release of airborne asbestos particles during and after disposal.

Surfactant

The composition includes a synergistic combination of a nonionic surfactant and a cationic surfactant. While not intending to be limited thereby, I believe that the nonionic surfactant aids in absorption and penetration of the composition into the asbestos containing material by reducing the surface tension of the composition while the cationic surfactant aids in absorption and penetration of the composition into the asbestos containing material by interacting with the typically anionically charged asbestos.

Surfactants are a well known and well characterized group of substances, all of which have the ability to affect the detergency, foaming, wetting, emulsifying, solubilizing and/or dispersing properties of a liquid.

The composition should include sufficient nonionic surfactant to reduce the surface tension of the composition to less than about 40 dynes per cm. Typically, about 0.1 to 2 wt-%, preferably about 0.2 to 0.5 wt-%, nonionic surfactant is sufficient to obtain the desired reduction in surface tension.

Suitable nonionic surfactants for use in the composition include any of the well known and readily available nonionic surfactants. For a detailed discussion of nonionic surfactants see Kirk-Othmer; *Encyclopedia of Chemical Technology*, 2d Edition, Vol. 19, pages 531-554, which is hereby incorporated by reference.

The composition should also include about 0.1 to 1 wt-%, preferably about 0.2 to 0.5 wt-%, cationic surfactant. Suitable cationic surfactants for use in the composition include any of the well known and readily available cationic surfactants. For a detailed discussion of cationic surfactants, see Kirk-Othmer, *Encyclopedia for Chemical Technology*, 2d Edition, Vol. 19, pages 554-564, which is hereby incorporated by reference.

Preferably, the composition is non thixotropic. Most preferably, the composition is a substantially Newtonian fluid. Penetration of the composition into an asbestos-containing material can be significantly reduced if the composition is thixotropic as the composition is typically placed under significant sheer when sprayed onto the asbestos-containing material which, if the composition is thixotropic, will result in a temporary increase in the viscosity of the composition.

Optional Components

Optionally, the composition may further include a defoamant, a corrosion inhibitor a buffering agent, a freezing point depressant, and/or a dye.

The composition may include an effective defoaming amount of any of the various, readily available defoamants. Excessive foaming of the composition after it is applied can reduce penetration of the composition. Typically, about 0.05 to 0.5 wt-% defoamant is sufficient to prevent excessive foaming.

The composition may include an effective corrosion inhibiting amount of any of the various, readily available water-soluble corrosion inhibitors. Typically, about 0.05 to 0.5 wt-% corrosion inhibitor is sufficient to obtain the desired corrosion inhibiting effect.

The composition may also include an effective amount of any of the various, readily available buffering agents. Without a pH buffer, the composition typically has a pH of about 7 to 8. I have discovered that by altering the pH of the composition to about 9 to 10, the growth of undesired microbes can be significantly reduced. Typically, about 0.1 to 0.5 wt-% buffering agent is sufficient to achieve the desired pH.

The composition may further comprise a freezing point depressent, such as a lower alcohol. Preferably, sufficient freezing point depressant is employed to decrease the freezing point of the composition to less than about −10° C. Typically, about 1 to 3 wt-% ethanol is sufficient to obtain the desired freezing point depression.

To achieve the desired balance between penetration and encapsulation efficiency, the composition preferably has a solids content of about 3 to 12 wt-%. Most preferably, the composition has a solids content of about 6 to 10 wt-%. A solids content of less than about 3 wt-% can greatly enhance penetration of the composition into an asbestos-containing material but is not preferred unless such enhances penetration is necessary as such a solids content can result in ineffective encapsulation of the asbestos-containing material, resulting in the potential for airborne release of asbestos during collection and disposal. At the other extreme, a solids content of more than about 12 wt-% can result in ineffective penetration of the composition into an asbestos-containing material.

Method of Application

Asbestos-containing material may be effectively debrided from a structural unit with a minimum release of airborne asbestos particles by (i) contacting the asbestos-containing material with the composition of my invention, (ii) allowing the composition to penetrate into and be absorbed by the asbestos-containing material, (iii) debriding the treated asbestos containing material from the structural unit, (iv) collecting the removed asbestos-containing material, and (v) allowing the collected asbestos-containing material to be encapsulated by the composition of my invention.

The composition of my invention may be applied to the asbestos-containing material by any of the currently employed means to apply such wetting compositions to asbestos-containing material, including the commonly employed low pressure spray gun. Preferably, the composition is sprayed or atomized onto the asbestos-containing material at a loading of about 0.8 to 4 liters composition per square meter asbestos-containing material, varied within this range in accordance with the density and thickness of the asbestos. To be effective, the composition should be allowed to contact the asbestos containing material for at least about 30 seconds per millimeter of asbestos-containing material thickness prior to removing the asbestos. This provides sufficient time for the composition to effectively penetrate and be absorbed by the asbestos-containing material.

The treated asbestos-containing material may be removed by any of the currently employed means to debride asbestos from structural units such as the most commonly employed method of scraping the asbestos containing material from the structural unit and allowing it to drop to the floor.

The removed, asbestos-containing material may be collected in any suitable, OSHA and EPA approved, container for purposes of storage and disposal. The commonly employed polyethylene plastic bag is sufficient. The size of the container is dictated by cost and handling considerations. Generally, containers from about 10 to 1,000 liters, preferably about 40 to 100 liters have been found to be most effective.

For some applications, where the asbestos-containing material is severely contaminated with dust, dirt or grime and/or the asbestos-containing material is particularly thick or dense, more than one application of the composition may be necessary. In such situations, it is preferred to employ a dye in the composition as an indicator of the penetration depth. A typical procedure under such circumstances would be to contact the asbestos containing material with the composition, scrape the wetted portion of the asbestos containing material from the structural unit, and then repeating the contacting and scraping steps until all asbestos-containing material is removed.

EXAMPLE I

Into a mixer equipped with an impeller was placed 84.16 parts water and 0.02 parts Polor Brilliant Blue Rawl (a blue dye available from Passaic Color Company). The water and dye were blended in the mixer to a uniform color. Into a separate vessel was placed 0.22 parts Varstat 55 (a monoalkyl imidazolium ethyl sulfate available from Sherex Chemical Company, Inc.) and 0.80 parts ethanol. The Varstat 55 and ethanol were blended in the vessel until uniform.

Into the mixer containing the water and dye was placed, in order, 13.30 parts by weight Res 4040 (a nonionic-surfactant-stabilized styrene butyl rubber latex having a viscosity of about 150 cps and a maximum particle size of about 0.2 microns, available from the Union Chemicals Division of Union 76), 0.30 parts Surfynol TG (an 83% concentration of an acetylenic glycol blend in ethylene glycol available from Air Products and Chemicals, Inc.), 0.20 parts Drewplus Y-250 (a proprietary defoamant available from the Drew Chemical Company), and 0.20 parts granular tripotassium phosphate, to form a first mixture. The first mixture was blended for five minutes at which time the Varstat 55 and ethanol blend, along with an additional 0.80 parts ethanol, were added to the first mixture to form a second mixture. The second mixture was blended for an additional 10 minutes and then poured from the first mixer into 55 or 5 gallon containers for shipping and storage. The composition was light blue and had a density of 8.4 lbs./gal., a Brookfield viscosity of 6 cps at 72° F. and a pH of 9.3.

EXAMPLE II

The composition of Example I was tested for surface tension, slipperiness, dryability and penetration. For comparison purposes, these same characteristics were also tested for water and a commercially available sodium silicate based solution available under the trademark BWE-5000 from Better Working Environment, Inc. Results from the test are set forth in table 1.

Surface tension was measured by means of a Rosano surface tensiometer at 85° F. Slipperiness was determined by measuring the sliding coefficient of friction for each composition on polyethylene film in accordance with ASTM D-1894. Dryability was determined by saturating a one inch thick sample of mineral wool with the composition and allowing the wetted mineral wool to dry at 72° F. for 24 hours, at which time the suppleness of the mineral wool was measured by touch. Penetration was measured in accordance with TM-182 set forth at the end of this Example.

TABLE 1

| Composition | Surface Tension (dynes/cm) | Sliding Coefficient of Friction | Dryability | Penetration (in./hr) |
| --- | --- | --- | --- | --- |
| BWE-5000 | 31.8 | 0.093 | dry and hard | 4.4 |
| WATER | 71.5 | 0.225 | wet and soft | NA |
| Example I | 30.1 | 0.195 | wet and soft | 6.0 |
| (diluted 1:1 with water) | 30.3 | — | — | — |
| (diluted 1:4 with water) | — | — | — | 12.0 |

When used to reduce the number of airborne asbestos particles released during the removal of an asbestos-containing material from a structural unit, a composition preferably has (i) a low surface tension in order to provide better penetration and absorption, (ii) a high coefficient of friction in order to minimize hazardous slippery conditions, (iii) an effective penetration rate and depth into an asbestos-containing material in order to reduce drippage and eliminate the need for reapplications of composition, and (iv) the ability to remain fluid for at least 24 hours after application in order to avoid problems associated with unintentional drying of the composition after application but prior to removal. As evidenced by the data provided in Table 1 (i) the surface tension of the composition of Example I is comparable to that of BWE-5000 and is one half that of water, (ii) the slipperiness of the composition of Example I is only about 15% greater than water and about one half that of BWE-5000, (iii) the composition of Example I is capable of penetrating an asbestos containing matrix about 30% fast than BWE-5000, and (iv) the composition of Example I remains fluid for at least 24 hours while BWE-5000 dries out and becomes hard within 24 hours.

Test Method 182

SCOPE

This test evaluates the penetration and absorption of materials into various fibrous materials such asbestos, fiberglass, or mineral wool.

EQUIPMENT

1. Several clear tapered 3⅜ inch long plastic test tubes open at the top and bottom and tappering from a diameter of ⅜ inch to a diameter of about 9/16 inch.

2. A 6 inch long, ¼ inch diameter rod for tamping fibers into the tubes.
3. A rubber hammer.
4. Vessels having a diameter of at least 2 inches.
5. A stop watch.
6. A ruler.

PROCEDURE

1. Fill the tubes about ⅜ inches from the top with the fiber to be tested. Employing moderate hand tamping, compact the lose fibers into the smaller diameter end of the plastic tubes.
2. Fill the vessels with ¼ inch penetrating material. If depth of penetrating material decreases to less than ⅛ inch during the test, immediately refill to ¼ inch depth as often as necessary.
3. Place the fiber-containing tubes into the penetrating material-containing vessels, tappered end down, and stand tubes upright. Start the stop watch.
4. At 3 minute intervals, measure the depth of the penetrating material in each tube by measuring down from the top edge of the tubes.
5. After 30 minutes, as indicated by the stop watch, remove the tubes from the vessels. Remove the fibers from the tube by turning the tube upside down, placing the tamping rod in contact with the fibers, and striking the tamping rod with the rubber hammer. Place the fibers into an empty container using the tamping rod.
6. Dry the fiber material in a forced air oven at 140° F. for 16 to 24 hours.
7. After drying, compare the bonding of the fibers and note the thickness of loose, unbound fibers.

REPORT

1. Rate of penetration (inches/minute).
2. Time to reach top of fibers.
3. Thickness of loose fibers on top after drying.
4. Relative binding strength and saturation compared to a control, throughout the test sample.

The specification and examples are presented above to aid in the complete and non-limiting understanding of the invention. Since many variations and embodiments of the invention can be made without departing from the spirit and scope of the invention, the invention resides in the claims hereinafter appended.

We claim:

1. A penetrating composition for wetting and encapsulating an asbestos-containing material which, upon application, is capable of reducing the amount of airborne asbestos generated during and after debriding of the asbestos-containing material from a structural unit, which composition comprises:
   (a) about 70 to 95 wt-% water;
   (b) about 5 to 30 wt-% latex having a solids content of about 45 to 60 wt-% based upon the latex, a Brookfield viscosity of less than about 1500 cps and a particle size of less than about 0.4 microns; and
   (c) an effective amount of a surfactant selected from the group consisting of a nonionic surfactant and a mixture of a nonionic and a cationic surfactant sufficient to provide a rate of penetration of the composition into a construction-type asbestos-containing material of at least about 2 mm/minute.
2. The composition of claim 1 wherein the solids content is about 3 to 12 wt-%.
3. The composition of claim 1 wherein the rate of penetration is about 6 to 12 inches/hour.
4. The composition of claim 1 wherein the Brookfield viscosity of the composition is about 6 cps.
5. The composition of claim 1 wherein the surfactant comprises a mixture of nonionic and cationic surfactants.
6. The composition of claim 1 further comprising an effective defoaming amount of a defoamant.
7. The composition of claim 1 further comprising an effective corrosion inhibiting amount of a water-soluble corrosion inhibitor.
8. The composition of claim 1 further comprising an effective amount of a buffering agent sufficient to buffer the composition to a pH of about 9 to 10.
9. The composition of claim 1 further comprising an effective amount of a freeze-thaw stabilizer sufficient to stabilize the composition upon freezing down to less than about −10° C.
10. The composition of claim 1 further comprising a dye.
11. The composition of claim 1 wherein the latex is a latex of a styrene butyl rubber, an ethylene vinyl acetate, an acrylic homopolymer or a vinyl acrylic copolymer.
12. The composition of claim 11 wherein the latex is a latex of styrene butyl rubber.

* * * * *